United States Patent

[11] 3,596,003

[72] Inventor Raffaele Poli
Galleria Del Leone, 3, Bologna, Italy

[21] Appl. No. 775,297
[22] Filed Nov. 13, 1968
[45] Patented July 27, 1971
[32] Priority Nov. 15, 1967
[33] Italy
[31] 7425

[54] AUTOMATIC PUNCHED MULTICARD DEVICE FOR CALL DIALING OF TELEPHONE NUMBERS
3 Claims, 16 Drawing Figs.

[52] U.S. Cl. .......... 179/90 CS
[51] Int. Cl. .......... H04m 1/48
[50] Field of Search .......... 179/90 B, 90 CI, 90 ADO, 5; 340/357, 358

[56] References Cited

UNITED STATES PATENTS

| | | | |
|---|---|---|---|
| 3,327,828 | 6/1967 | Dannatt .......... | 197/98 |
| 3,078,349 | 2/1963 | Sasaki .......... | 179/90 |
| 3,274,345 | 9/1966 | Ham et al. .......... | 179/90 |
| 3,194,893 | 7/1965 | Auel .......... | 179/90 |
| 2,813,931 | 11/1957 | DeForest .......... | 179/90 |
| 2,505,069 | 4/1950 | Savino .......... | 179/90 |

*Primary Examiner*—Kathleen H. Claffy
*Assistant Examiner*—Tom D'Amico
*Attorney*—Steinberg and Blake

ABSTRACT: Automatic device for call dialing of stored telephone numbers by means of punched cards allowing to select one of a plurality of telephone numbers or addresses and dial such a selected number or address. Punched card system allows a substantial time saving and is particularly useful in direct dialing services.

INVENTOR
RAFFAELE POLI
BY
ATTORNEYS

INVENTOR

RAFFAELE POLI

BY Stenberg & Blake

ATTORNEYS

INVENTOR
RAFFAELE POLI
BY Steinberg & Blake
ATTORNEYS

INVENTOR
RAFFAELE POLI
BY Steinberg & Blake
ATTORNEYS

INVENTOR
RAFFAELE POLI
BY Stenberg & Blake
ATTORNEYS

AUTOMATIC PUNCHED MULTICARD DEVICE FOR CALL DIALING OF TELEPHONE NUMBERS

The present invention relates to an automatic device for call combination of telephone numbers as stored by punched cards.

As known, the progressive and rapid extension of direct dialing on a national scale and the expectations for future extensions thereof on a international scale would involve, as a direct result, an increase in the digits of telephone numbers or addresses, so that the ordinary operation for selecting a subscriber's number and manual scanning such a number on the dial or finger disc of a normal telephone set, as well as the need of repeated attempts in the event of a busy line, have become more and more laborious and, therefore, have brought back, as a matter of great interest, the problem for automatic dialing devices, or devices enabling a time by time selection for one of a plurality of predetermined telephone numbers or addresses, so as to obtain automatically the call signal of the desired telephone communication, without having to manually operate the normal dial or finger disc of the telephone set.

Generally, an automatic selecting-dialing device for telephone number call from a subscriber's telephone station comprises an automatic dialing member for telephone numbers and a selective multiaddress storing means wherein, under any convenient form and, for example, under the form of magnetizing pulses, storing is effected for those telephone numbers, the call need of which is expected to be likely, the automatic dialing member being operable by any preselected number of the stored numbers, so as to automatically effect the call corresponding to that preselected number.

However, the above-mentioned selecting-dialing devices usually suffer from the drawback, whereby the aforesaid storing means are closely connected to the automatic-dialing member, so that the device cannot be transferred from one to another subscriber (having a different index of likely call numbers), without having to erase, or to destroy the former subscriber's index numbers previously stored on the aforesaid storing means of the device.

Further, these devices are usually electronic or prevailingly electronic devices, the operation of which is generally highly delicate and not always reliable for extended working periods.

On the other hand, in many practical circumstances, the possibility of an immediate interreplaceability of a plurality of subscribers on a common automatic-dialing device, without it being required for this that each subscriber should every time erase and then restore his number index in the storing means of the device, would be desirable. An automatic-dialing device meeting this requirement would be particularly suitable, in addition to use in offices or homes, also for small or middle firms provided with a plurality of telephone lines, where an automatic-dialing device of a very simple, practical and reliable operation would have useful applications, provided it might be readily interchanged among a plurality of subscribers, where need should arise, so as not to burden the firm with the charge of a separate dial for each individual user in the firm.

The present invention is directed to this object, to this end providing an automatic selecting and dialing device for subscribers, wherein the storing means essentially comprise punched cards, each preselected telephone number being stored in the form of punched holes of the card, corresponding to the number digits and distributed thereon according to a particular distribution pattern which is distinctive of the preselected telephone number, said cards being selectively introduced into an automatic-dialing device for telephone numbers, so as to impart thereto a train of call pulses in accordance with the distribution pattern for the punched holes in the card, each punched hole subsequently closing one of a plurality of pulse forming circuits for the dial.

The features of the invention and the advantages resulting therefrom will be apparent from the following detailed description of a preferred embodiment thereof, given by way of nonrestrictive example, reference being made to the accompanying drawings, in which:

FIG. 1 schematically shows an automatic-dialing device for telephone number call according to the invention;

Figure 15:
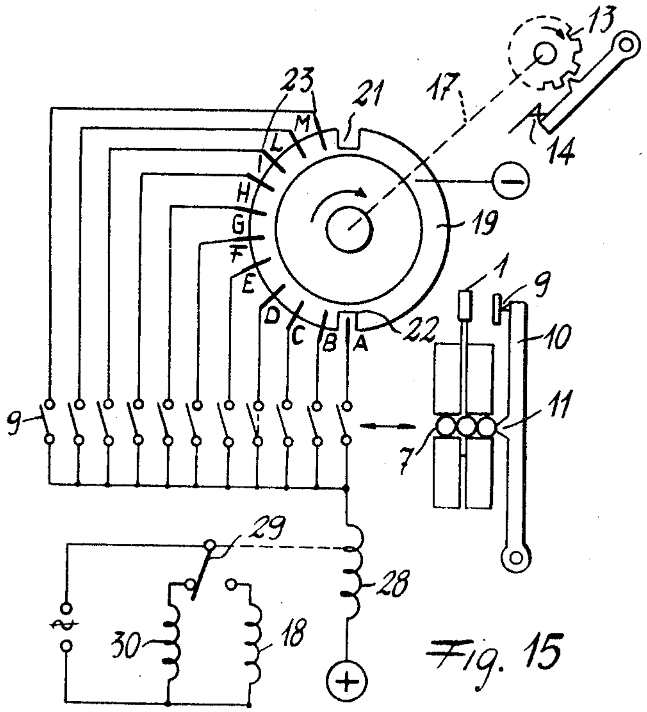
Figure 3:
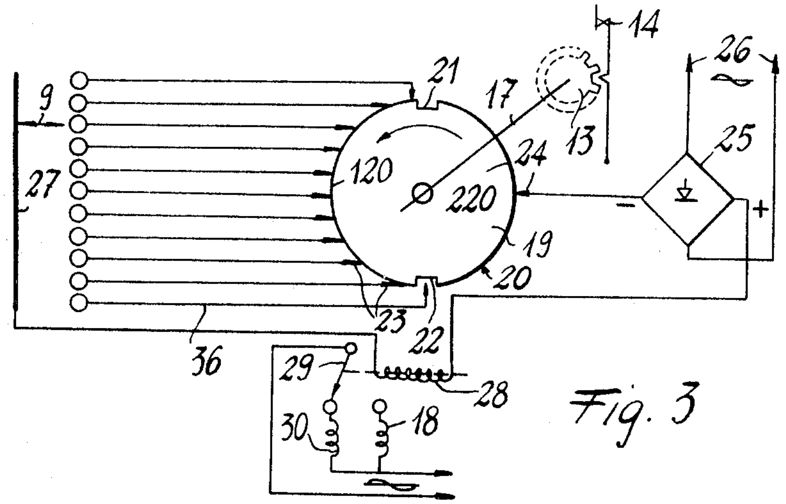
FIG. 3 is a wiring diagram of the automatic-dialing device shown in FIG. 1.
Figure 16:
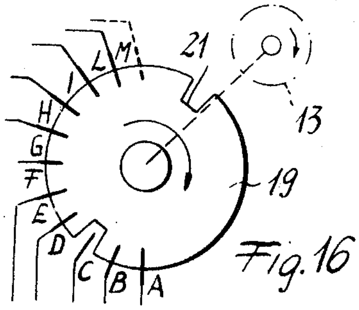
Figure 12:
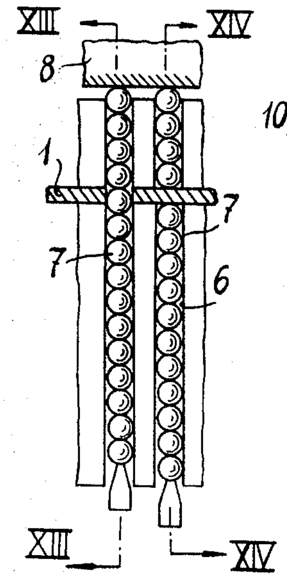
Figure 13:
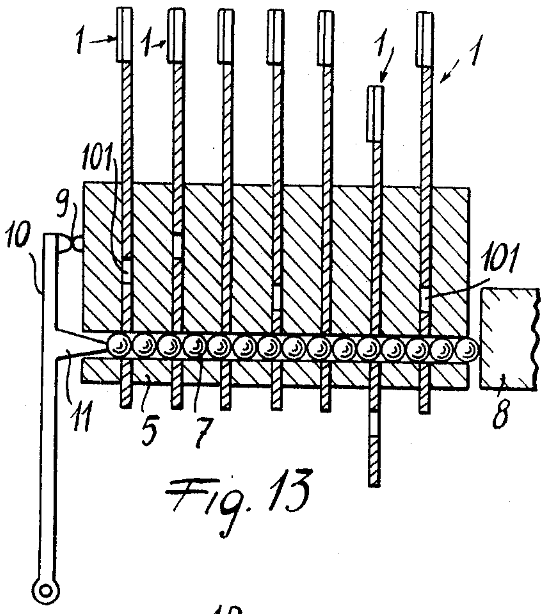
Figure 14:
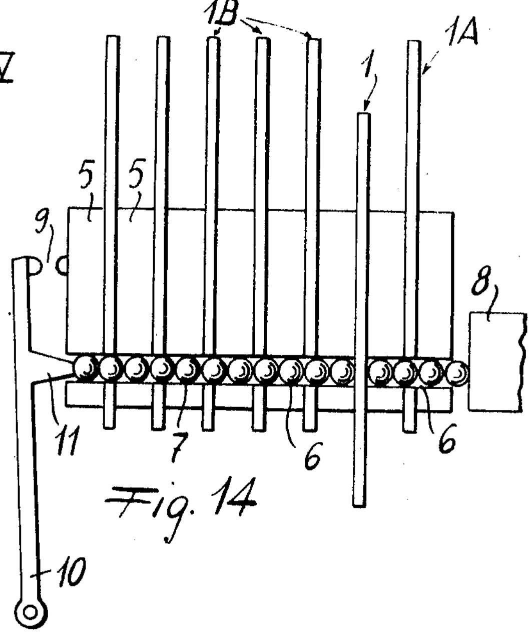

FIGS. 6—11 subsequently show the dialing mechanism for the telephone number as stored in the card of FIG. 5;

FIG. 12 is a horizontal sectional view showing a portion of the card container as completed with said cards and with a card at read out step, while the other cards are automatically blocked;

FIGS. 13 and 14 are cutaway views according to lines XIII–XIII and XIV–XIV, respectively, of FIG. 12; and FIGS. 15 and 16 illustrate the operation of the unidirectional dialing unit of the device according to the invention.

Figure 1:
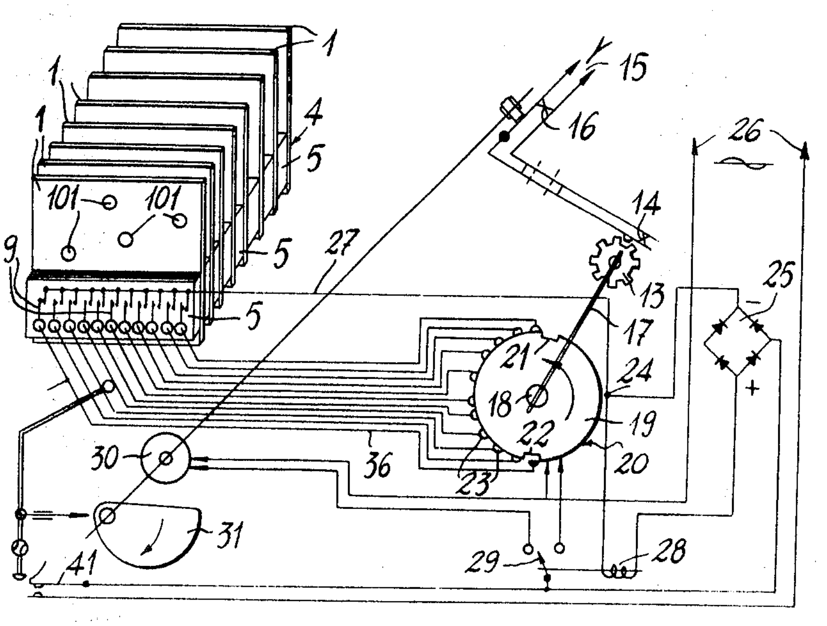
Figure 2:
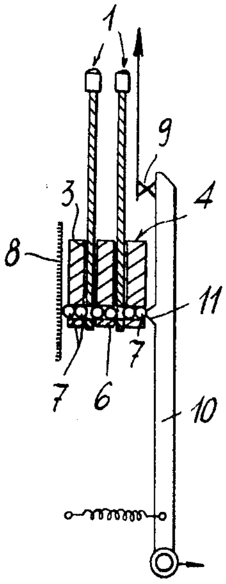
FIG. 2 is a demonstrative sectional view of the punched card container in the device of FIG. 1.

Referring to the drawings, and firstly particularly to FIG. 1, the dialing device according to the invention comprises a plurality of punched cards, each card corresponding to a desired telephone number, generally written at the top in a space 2 of the card, where also the subscriber's name is recorded. These cards are inserted into corresponding slots 3 of a container 4, and the set of cards 1 along with the related container 4 make up the storing element or means of the device.

The object of the invention is to automatically obtain the formation of call pulse trains of the telephone number corresponding to any preselected card in the card container, by operating on the preselected card through a simple pressure movement thereon.

According to the invention, to this end the container 4 is formed of a plurality of interspaced separating elements 5, made of metal or other convenient material, which elements are assembled parallel to one another, so as to define the insertion slots 3 for cards 1. At the bottom, each of the separating elements 5 is passed through by a series of horizontally aligned holes 6.

The corresponding holes 6 of all the elements 5 are aligned to one another and small metal balls 7 are slidably accommodated in such holes, said small balls being held between a retainer 8 and a related contact 9, the arm 10 of which is provided with a pin 11 resiliently pressing on last small ball of a row of aligned small balls 7. Thus, it is apparent that at each operative position of a card an electric continuity will be provided through contact 9 only for that row of small balls with which that hole 101 of the punched card corresponds when aligned with the small balls in said row. Of course, holes 101 will be so arranged that for each subsequent operative position of the card only one hole 101 may come into alignment with holes 6 of separating elements 5. The different operative positions (or steps) of the card will be obtained by suitably moving the card through a powered cam, as hereinafter apparent. Thus, the card thickness will maintain for each operative position all contacts 9 open (in the example shown, 11 such contacts being provided) except for one of them and, namely, that contact corresponding with hole 101 of said card.

As best seen from the diagrammatic sectional views of the container as shown in FIGS. 12, 13 and 14, card 1 being read out, while closing contact 9 for one channel at a time (FIG. 13), for the other channels will so move the balls that, in addition to opening and maintaining contacts 9 open of related channels, will prevent any other card from being casually or intentionally lowered into the container. This is apparent from considering FIG. 14, in which card 1A is shown as blocked between card 1 being read out and retainer 8, while the remaining cards 1B cannot be lowered as blocked at least by the card being read out. Thus, the above structure forms a card blocking means for blocking movement of all cards except that one card which is selected.

The foregoing is the actual storing element of the automatic device according to the invention. It is only to be added that each card 1 is provided at the bottom with a series of horizontally aligned and interspaced holes 12 in correspondence with holes 6 to block and hold all of cards 1 still, except that lowered to operative position to dial the subscriber's number associated with it by holes 101.

The above-described storing element is functionally connected to a mechanical dialing device comprising a continuous dial 13 associated with breakdown switch 14, the opening for a determined time of which (such as in the order of one-tenth second) causes a call pulse to be generated and which is transmitted to a telephone exchange through telephone lines 15 when answer or consent contact 16 is open. As is apparent from FIGS. 1 and 15, the switch 14 may include contacts both of which are carried by leaves (FIG. 1) or one of which is on a pivoted arm (FIG. 15).

In normal disc dials of ordinary receiver sets, the dial is manually rotated through a determined angle for each subsequent digit of the called number and automatically returns to rest or inoperative position causing, during this return movement, the generation of call pulses corresponding to a digit for the telephone number of the subscriber being called. Obviously, the foreward movement of the dial is a lost movement in respect of call time, although necessary for conveniently loading the dial return spring.

In the automatic-dialing device according to the present invention such a lost movement is removed, to full advantage of dialing rapidity, due to the fact that dial 13 is provided with a unidirectional movement, or does not move back every time after the generation of a pulse train corresponding to a digit of the called number, but starts forward again to generate the pulse train relating to the next digit following the regular spacing between the digits. To this end, dial 13 is keyed on the shaft 17 of a motor 18, on which shaft there is also keyed the insulating disc 19, at the periphery of which an electrically conducting ring 20 is secured, such a ring being divided, for example, into two portions 120, 220 by two opposite notches 21 and 22. The sliding contacts or brushes 23 are equidistantly mounted on one portion of ring 20, said brushes being respectively connected to contacts 9 and so arranged that on rotation of disc 19 the electric connection of each of such brushes with brush 24 is subsequently and orderly interrupted, brush 24 being connected to one of the outlet terminals of a bridge rectifier 25 supplied by an AC line 26, the other outlet terminal of this rectifier being connected to the bus bar 27 of contacts 9 through the field coil of a relay 28. This relay controls the energizing circuit of motor 18 which, therefore, automatically stops when brush 23 related to that closed contact 9 is insulated as a result of one of said opposite notches 21 or 22 of ring 20 passing at this brush. Since rotation of disc 19 (and hence also dial 13) is dependent upon the position of the brush, with respect to that contact 9 which at a given working or operative step is closed with respect to the previous stop position of said dial, said rotation will be more or less extended, so that the corresponding pulse train is of a greater or smaller length depending upon the digits of the called number. At the next working or operative step, on energizing a further brush said disc 19 will start again, then stopping at the brush being involved and so on until number dialing is completed. More particularly, ring 20 associated with a conveniently notched or toothed dial 13 will cause a pulse generation for calling at each interspace between two consecutive brushes 23. Therefore, having set the number of pulses to be provided, it will suffice to leave at an inoperative condition as many brushes as the corresponding pulses. For example, the selector being stationary at the brush which has generated the former pulses, should now five pulses be generated, it will suffice to count five brushes and energize the fifth brush. Particularly, in order to generate a train of 10 consecutive pulses (corresponding to "zero" digit) an eleventh brush was required, so as to have at any moment 10 operative brushes, the starting brush having been insulated.

In the drawing, a disc 19 is shown, the conducting ring 20 of which has two opposite notches 21, 22, since it is assumed that said disc rotates at a speed of 30 r.p.m.; conversely, should the speed be 60 r.p.m., only one interruption zone would be required. Such speeds are related to pulse duration which must be in the order of one-tenth second.

In addition to stopping motor 18, the deenergization of relay 28 also involves the switching or change over of its moving contact 29 energizing the circuit of motor 30. On being operated, this motor causes the card to advance through a step by a proper cam 31 (step cam), so that said card will establish with another hole 101 a new contact in the corresponding channel; thus, relay 28 will be reenergized and start motor 18 again, stopping motor 30, and so on until no more holes are left and motor 30, being no longer cut off, will restore the card to rest position.

Summarizing the foregoing disclosure, and referring now to exemplary FIGS. 15 and 16, motor 30 is for step raising the card being read out through cam 31. This motor is energized when relay 28 is deenergized. Conversely, when relay 28 is energized, motor 18 is operating and simultaneously rotates selector disc 19 and notched or toothed disc 13, the latter driving the pulse switch 14. Therefore, the pulse trains for the digits are generated by said switch with the card being still and card movement occurs in the interval between one and another pulse train.

In order to energize relay 28, a contact 9 has to be closed, and this is attained when a hole 101 of the card is moved into alignment with the row 6 of balls 7 associated with that contact 9. Motor 18 starts and stops when one of notches 21 or 22 of disc 19 opens that contact 23 which is in series with contact 9 closed by the balls. During movement of motor 18, said switch 14 will have generated through disc or dial 13 some recovery pulses in an amount equal to that of contacts 23 scanned by disc 19.

For example, assumed that disc 19 (FIG. 15) has its notch 22 on contact A, if contact 9 is closed in series with D through a hole 101 of the card and associated row of balls, motor 18 starts and stops with notch 22 of disc 19 on contact D after scanning three contacts, whereby switch 14 will have generated three pulses at the same time.

When motor 18 at a stop condition (relay 28 deenergized), motor 30 starts and causes the card being read out to move through one step. As soon as a hole 101 is moved into alignment with anyone of channels 6 of balls 7, the associated contact 9 is closed, whereby relay 28 is energized, so that motor 30 is deenergized and motor 18 starts to operate again. Should the contact 9 closed by the card be F (while disc 19 is still stationary on D), disc 19 will cause dial 13 to emit two pulses. In other terms, disc 19 will scan two contacts, stopping on F, and notched or toothed disc 13 will pulse switch 14 through two pulses. Thus, without moving back to original or start contact A after each digit, the pulse trains relating to the successive digits of the number to be dialed are unidirectionally generated.

From the foregoing it will also be apparent that, as a general rule, to generate pulse trains as formed of a maximum of $n$ pulses per train, $n+1$ channels are required, that is $n+1$ contacts 9. Particularly, to generate a train of 10 pulses (conventionally corresponding to digit "zero") 11 contacts 9 will be required (and as many contacts 23 on disc 19).

Thus, assumed that the eleventh contact M be vacant (FIG. 16), to dial a "zero," that is to generate a train of 10 pulses, disc 19 has to scan 10 contacts. For example, should notch 22 of disc 19 be still on contact C, in order to provide the 10 pulses required, it shall scan 10 contacts, that is move back onto said contact C. On the other hand, since a contact 9 has to be closed in order to start motor 18, and as in the provision of 10 contacts only the contact which should be closed would still be that in series with C, this contact being still open by notch 22 of disc 19, motor 18 would be no more capable of starting again. Thus, the maximum number of pulses would be achieved by closing contact B, but this maximum number would be equal to nine only.

Since, to dial "zero" 10 pulses are required, an eleventh channel has been provided along with its respective contact M. Thus, by closing contact B, 10 pulses can be obtained. Of course, the same is for any other contact.

As a final operation, during the travel of the last section of the card and after having completed the digits for the called telephone number, suitable cams 32, 33 and 34, respectively, will short-circuited the call pulse switch, open the receiver (earpiece) circuit, which was shorted from the very starting of the device, and insert the contact 35 corresponding to the eleventh channel 36 (FIG. 4), in order to cause said rotating ring 20 to stop on that brush 23 corresponding to this channel.

Figure 4:
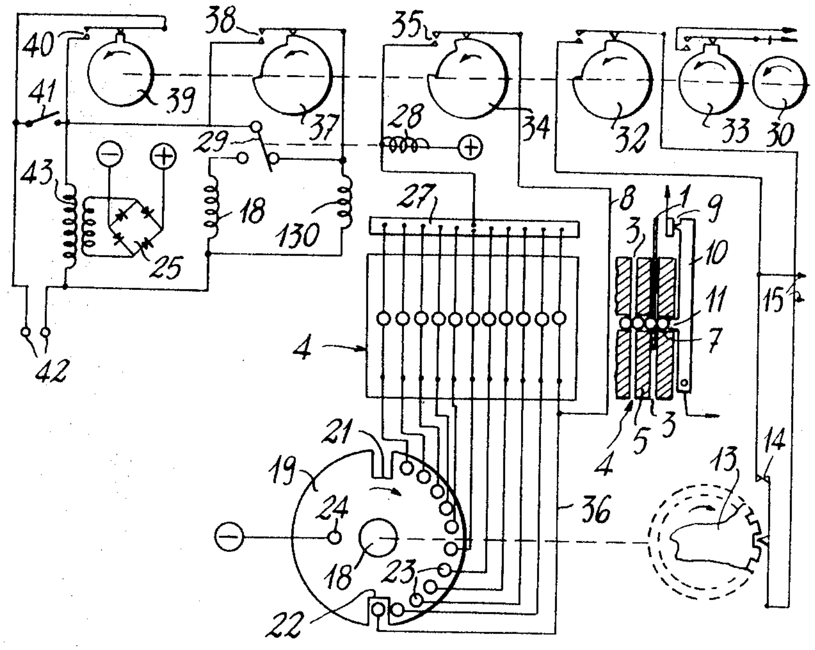
FIG. 4 is an electric diagram of the device according to the invention.

On considering again the dialing unit according to the invention, it should be noted that the rotating ring 20 of disc 19 to dial the digits of the telephone number as stored in the card may accomplish also a plurality of revolutions and fractions of a revolution, depending upon the total amount of pulses to be generated. Upon reaching this total amount through subsequent pulse trains, cam 32 (FIG. 4) will short the pulse switch closing the short-circuit contact 16 and cam 34 will connect the eleventh brush 36, thus controlling the movement of ring 20 to rest position, as shown in FIG. 4.

Further, cam 37 will close contact 38, thus prearranging the energizing circuit 130 of motor 30 for a next call operation, while cam 39 will open holding contact 40, parallel shunted on the pushbutton switch and which maintains the supply for the device as derived from AC supply line 42. As usual, rectifier 25 is supplied by mains or power line 42 through a stepdown transformer 43.

It should be noted that in the embodiment, as shown, the circuits for generating the pulse trains are closed when the preselected card has a hole 101 thereof corresponding with one of the rows of balls 7. However, the same result, that is the generation of pulse trains, could be obviously achieved, also by reversing the functions of the solid portions and voids (holes) in the card. Then, the circuits at the holes would be open, whereas that circuit would be closed (a unique circuit for each operative step of the card) at which the card has a solid portion.

From the foregoing, it is apparent that the invention provides an automatic-dialing device, the operation of which is prevailingly mechanical, which device is extremely simple, and the operating duration of which is substantially unlimited, there being no parts or components subjected to wear or modifying its mechanical or physical features.

In the embodiment just described of the invention, the dialing of telephone numbers to nine digits is provided, but it is apparent that the number of digits can be increased by merely modifying the device structure. Further, the device according to the invention may be fitted with 10 pushbuttons for manually dialing the telephone numbers in replacement of the ordinary manual disc dial. The punched card system allows a substantial time saving and makes errors impossible to occur in dialing called numbers, which is particularly useful in direct dialing services.

Figure 5:
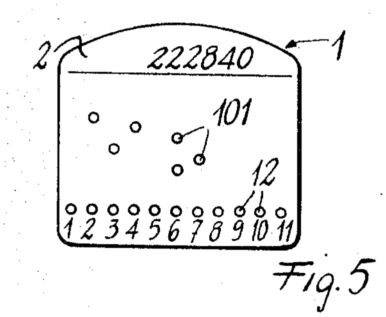
FIG. 5 is a front view of a punched card for use in said dialing device.

In FIG. 5 there is shown a card having holes corresponding to the telephone number "222,840222840" and the next FIGS. 6 to 11 subsequently show the mechanism of dialing this number by the automatic device according to the invention. Movement of cam 31 upwardly moves reading out card 1 in the container, gradually moving the individual holes 101 (one by one) at the reading channels, thus causing the correspondent contact 9 to be closed.

Figure 6:
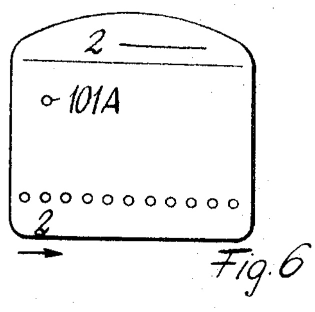

FIG. 6—Dialing of the first "2": cam 31 upwardly moves the card through one step and hole 101A causes the closure of contact 9 related to that channel determining the union of two pulses from the initial or rest position of the disc. This contact will be opened when the brush 23 of said contact is insulated.

Figure 7:
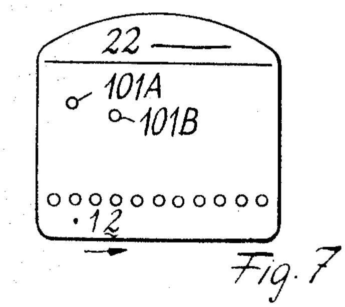

FIG. 7—The card is moved through a further step: hole 101B closes a further channel, spaced two pulses apart from the former channel. Thus, the reading of the second "2" is provided.

Figure 8:
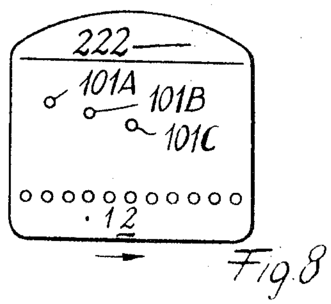

FIG. 8—A further upward step of the card and reading of the third "2" (hole 101C of the card is engaged).

Figure 9:
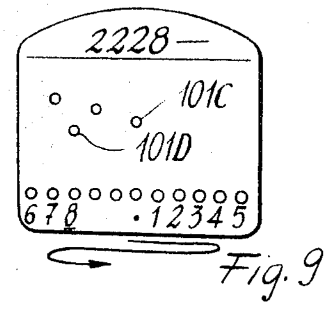

FIG. 9—A further upward step of the card and resulting reading of number "8" (hole 101D).

Figure 10:
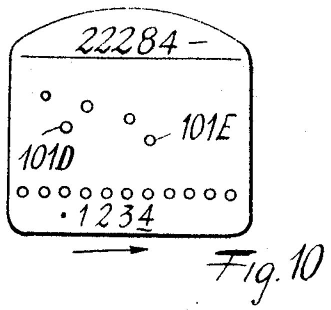

FIG. 10—Another step: reading of number "4" (hole 101E).

Figure 11:
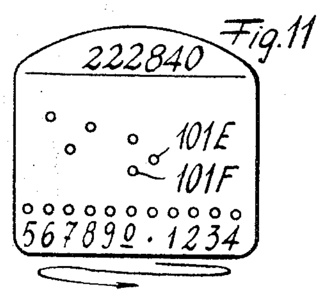

FIG. 11—Last step: reading of "zero" (hole 101F).

Should the number of channels be 10, motor 18 could not have started, as the relative contact 23 was insulated from the very beginning. As it can be seen from FIG. 11, two holes 101C and 101F of the card are aligned in the same channel; hole 101C has served for controlling the generation of the two pulses for one "2," while hole 101F has next served for controlling the 10 pulses of one "zero."

Of course, the invention is not limited to the embodiment as described and shown, but many changes and modifications can be made thereto, particularly from a structural standpoint, without departing for this from the informing principle of the above set forth invention and hereinafter claimed.

I claim:

1. An automatic device for call dialing of any telephone number selected from a predetermined plurality of such numbers, comprising a selecting-dialing unit of telephone call pulses and an assembly of a plurality of storing elements each of which is formed of a punched card corresponding to a preselected telephone number of said predetermined plurality of telephone numbers, said cards being arrayed within a card container operatively connected to said selecting-dialing unit, so that any preselected one of said cards can control said selecting-dialing unit directly from the card container by a simple pressure operation on the preselected card, said card container being formed with a plurality of ball-accommodating channels communicating with all of said cards and provided with a card-blocking means for blocking movement of all except a selected one of said cards, said card-blocking means comprising balls arranged within said channels for responding to movement of a selected card to block all the other cards when the selected card has been displaced to an operative position, the selecting-dialing unit comprising dialing circuits the number of which is one more than the maximum number of pulses provided for call pulse trains, there being 11 dialing channels, the maximum number of pulses being 10 and including one which corresponds to digit "zero" of a telephone number, a plurality of cards, operatively and selectively connectable to said selecting-dialing unit to generate subsequent pulse trains up to a maximum of 10 pulses per train, each card having a number of holes corresponding to the number of digits of the telephone number associated with said card, such holes being distributed on the card, one for each operative feeding step of the card, according to a predetermined distribution pattern peculiar to the telephone number associated with the card, each of said holes subsequently causing the generation within said dialing unit of pulse trains comprising the next digits of the telephone number in the card, the generation of each train depending upon the pulse number of the next preceding train, so that a single column of the card may contain a plurality of aligned and equidistant holes, corresponding to different digits of the telephone number associated with said card, said selecting-dialing unit comprising a unidirectionally moving dial operatively connected with a selecting disc which sequentially scans said dialing channels of the card container, said disc revolving in the same direction through successive revolutions and fractions of revolutions substantially corresponding to the successive digits of the telephone number associated with any preselected card of the container, while a feeding cam moves the card intermittently through subsequent operative steps, a pair of motors one of which is a card-moving motor and is operatively connected to said feeding cam for actuating the latter and the other of which is a pulse dialing motor and is operatively connected to said disc for rotating the latter, and means for automatically energizing said motors alternately.

2. A device according to claim 1, wherein the selector comprises an electrically conducting a ring having at least one peripheral notch, a collecting brush and a series of equidistant brushes engaging said ring at the periphery thereof and each connected to one of said channels, and a relay having a field coil connected in the circuit common to said channels, said relay alternately connecting the pulse-dialing motor and the card-moving motor, the changeover between said motors being accomplished every time said notch opens the circuit of that brush which is closed by the presence of a hole in the reading out card as aligned with one of the rows of balls in the card container.

3. A device according to claim 2, wherein the card container has a plurality of equidistant slots, each of which receives a card having at least one telephone number stored in the form of holes through the card, said container comprising a pack of spacer elements having a plurality of holes aligned according to a number of parallel channels, the number thereof being larger by one than the maximum number of pulses provided for the call pulse trains to be dialed, in each row of holes there being provided a plurality of small balls cooperating in alignment with a respective arm of an associated switch to close said switch when a hole of a card within a slot is aligned with the holes in said row.